Figure 1:
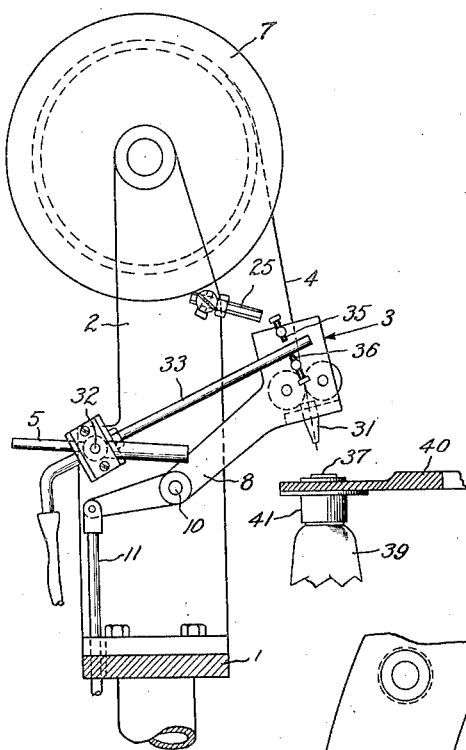

Jan. 10, 1928.

W. KONING 1,655,960

AUTOMATIC SOLDERING DEVICE

Filed April 8, 1926   2 Sheets-Sheet 1

Inventor:
Willem Koning,
by
His Attorney.

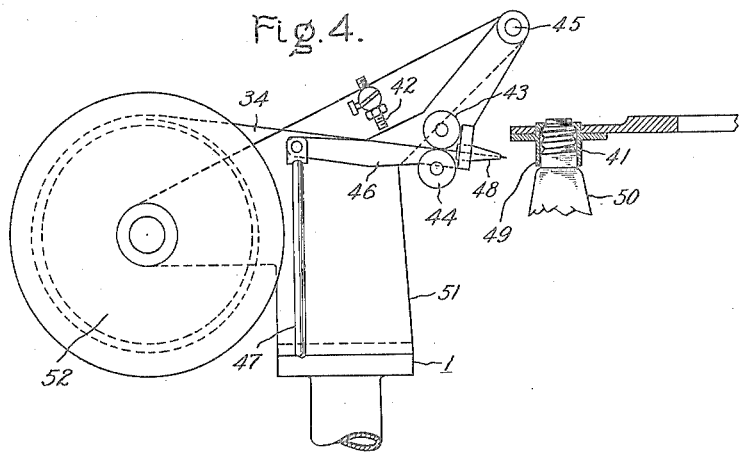
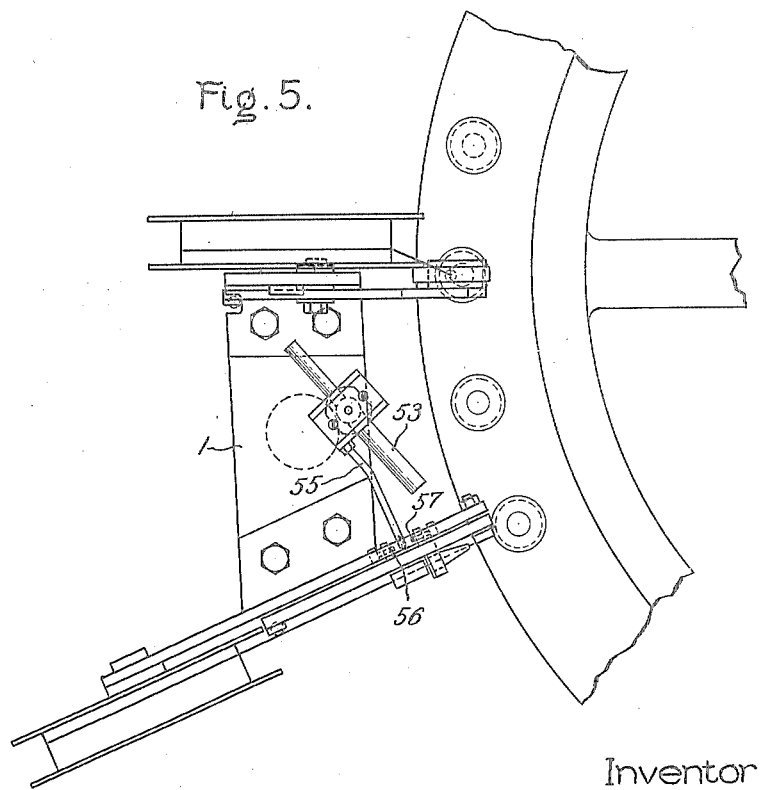

Patented Jan. 10, 1928.

1,655,960

UNITED STATES PATENT OFFICE.

WILLEM KONING, OF EINDHOVEN, NETHERLANDS, ASSIGNOR TO GENERAL ELECTRIC COMPANY, A CORPORATION OF NEW YORK.

AUTOMATIC SOLDERING DEVICE.

Application filed April 8, 1926, Serial No. 100,694, and in the Netherlands May 15, 1925.

The invention relates to soldering, and more particularly to a device for soldering joints automatically.

In hand soldering a cold low melting solder is applied to the joint which is to be soldered, and is melted by a soldering iron or by the heat of the joint. In some automatic devices for performing these successive functions mechanically, the solder is supplied as a wire, and is melted on the joint that is to be soldered. The solder can also be melted by raising the temperature of the joint high enough to cause that part of the cold wire of solder which comes in contact with it to become liquid, but in this case, the melting of the cold wire and the efficiency of the soldering depend entirely on the temperature of the joint.

According to this invention the soldering is rendered independent of the temperature of the joint by periodically taking the wire of solder to and from the joint and heating the solder wire while moving it towards the joint. The wire may be heated in such a way that a part of it is just melting when it reaches the joint, as, for example, by directing a flame to one particular part of the wire while the solder wire is being fed to the joint.

The melted solder will fuse on the joint, but in order to prevent it from being cooled off to soon and solidifying too quickly the flame may be directed for a short time on the soldered joint while the wire of solder is being removed, the flame afterwards moving back with the solder wire, but without touching it. The flame will then have to be so placed that the solder wire is heated while moving toward the next joint which is to be soldered. In order to speed up the soldering operation, the joint may also be heated beforehand, but this is not essential for a proper functioning of the device.

According to the invention the movement of the flame may be regulated by making the burner which heats the solder wire movable and by regulating its movement relative to the devices which feed the solder wire. To this end the feed mechanism is constructed so as to push the solder wire forward a certain distance while the feed mechanism is carried to the joint periodically by some means, such as an oscillating lever. The controlling mechanism of the burner can be so constructed that an arm, rigidly connected to the burner, is carried along in either direction by the oscillating lever through two adjustable stops on the lever arranged to permit enough play to cause the burner to halt a moment each time the direction of movement of the lever is reversed.

This method of soldering may be used in many cases where joints have to be soldered, but a special application is soldering the lead-in wires to the base of incandescent lamps in which case two soldering devices are arranged to operate one after the other on a number of lamps carried by a rotating table.

Figure 3:
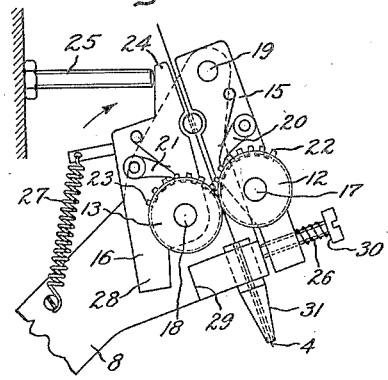
Figure 2:
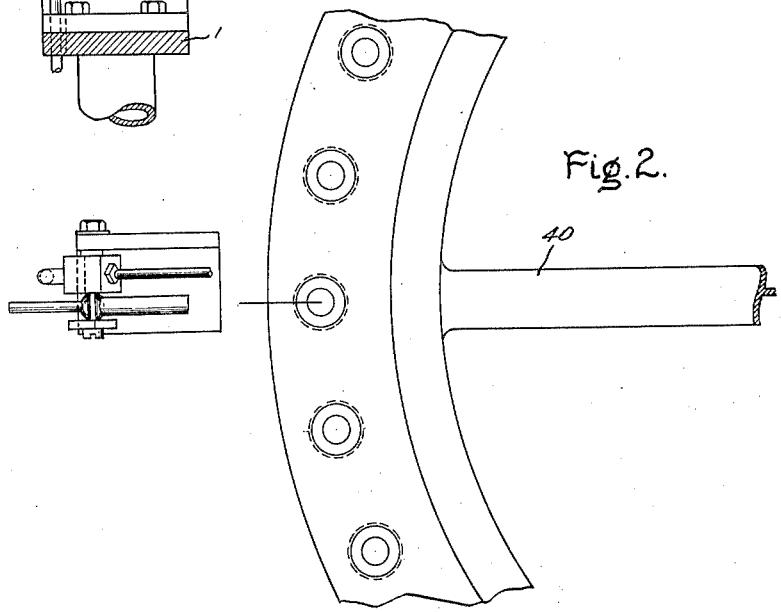

In the attached drawing which shows one form of the device described in the preceding paragraph and embodying this invention, Fig. 1 is a side view of a device by which the lead-in wire may be soldered to the center contact of a lamp base; Figure 2 a plan view of the device shown in Fig. 1, the mechanism that feeds the wire being omitted to simplify the drawing; Figure 3 a detail of the feed mechanism; Figure 4 a side view of the side soldering device for soldering the lead-in wire to the side of the base, and Figure 5 a plan view of the device of Fig. 4, also showing the devices of Figure 1 and of Figure 4 mounted on a basing machine.

The machine shown in the drawing has a frame 1, Fig. 1, on which the pedestal 2 is fastened to support the various parts of the soldering device. A rotating frame 40 carries the lamps one after another into position where the soldering device can operate on them.

The pedestal 2 supports a wire feed mechanism 3 which feeds the solder wire 4 and also carries the burners 5 which heat the wire. The feed mechanism for the solder wire comprises a spool 7 and a feed mechanism attached to the arm 8. This arm oscillates on a pin 10 on the pedestal 2 and may be moved up and down by a push rod 11 in any suitable way, not shown in the drawing.

Fig. 3 shows more in detail the mechanism for feeding the wire. It comprises two feed rolls 12 and 13 of which the roll 13 rotates on a pin 18 on the arm 8 and the roll 12 rotates on a pin 17 on a member 15, movable about a pin 19 on the arm 8. A dog 16 is pivoted on the pin 18. The member 15 and dog 16 also carry pawls 20 and 21 to engage gears 22 and 23 on the rolls 12 and 13.

This solder feed mechanism functions as follows: When the rod 11 moves up, the arm 8 will move down and the wire which is caught between the feed rolls 12 and 13 will be carried along and the spool 7 will unwind. When the rod 11 moves down the arm 8 will move up and the tail 24 of the dog 16 will encounter the stud 25. As this dog can swing on the pin 18 its nose 28 will normally be pressed against a stop 29 by a spring 27. When the arm moves up and therefore when the tail 24 encounters the stud 25 the dog 16 will swing in a clockwise direction as indicated by the arrow (Fig. 3). It will take the gear 23 along in this motion by means of the pawl 21. During the first part of the upward stroke of the arm 8 this pawl 21 and pawl 20 on member 15 will prevent the feed rolls being rotated by friction with the solder wire. The solder wire will be forced back on the upward stroke of the arm 8 and will resist being bent.

As the gear 23 meshes with a pinion 22 attached to the roll 12 rotation of the roll 13 will cause the roll 12 to rotate. The roll 12, as said before, is mounted on the member 15 which is movable about the pin 19. It is pressed against the roll 13 by a spring 26 on a set screw 30. In this way the rolls press on the solder wire 4. When the arm 8 moves up the clockwise swing of the dog 16 will cause the rolls 12 and 13 to revolve and to feed the solder wire 4 forward. When the arm moves down the solder wire will project out of the guide tube 31 a certain distance, which makes it possible to heat this projecting part of the solder wire to such an extent that it melts.

To heat the solder wire the movable burner 5 (Fig. 1) is provided. This burner can oscillate on a pin 32 on the pedestal 2 and when it is actuated correctly its flame will follow the solder wire. To actuate the burner a rod 33 is connected to it in such a way that the burner is carried along with the arm 8 through a lost motion connection comprising the rod 33 and the stops 35 and 36. When the arm 8 moves down the stop 35 will hit the rod and take it along. The burner 5 is moved until its flame is pointed to the part of the solder wire 4 which projects out of the guide tube 31. As the arm 8 continues its downward movement the burner will swing with and virtually be a part of this mechanism, and the flame will remain pointed to the same part of the wire. The flame of the burner may be so regulated that the wire melts by the time the joint is reached.

The joint 37 in this case is the spot where a lead-in wire of a lamp 39 is to be soldered to the center contact of the base. As shown in the drawing the lamp is supported by a rotatable frame 40 in which it is centered by a tube 41.

When the arm 8 moves up again the flame of the burner 5 will not immediately move up with the solder wire, as the solder melted from the wire should be heated a little more in order to spread it better over the joint. In order to achieve this result the stops 35 and 36 are constructed in such a way that the burner rod 33 has some play between them. When the arm is in its lowest position the burner rod 33 will press against the stop 35. When the arm starts up, the stop 36 will not immediately engage the rod 33 but only after some rotation of the arm 8 and as a result the flame of the burner points for a short time to the joint 37 on the center contact before it moves up with the solder wire. When the burner finally moves, the direction of the flame is such that it does not touch the solder wire during the remainder of its backward movement.

A similar arrangement is shown in Fig. 4 and Fig. 5 in which the device is arranged to solder the lead-in wire which is to be connected to the side of the base. The construction is modified slightly but the main parts are as described and as shown in Fig. 1 and Fig. 2. The feed rolls 43 and 44 move the solder wire 34 and the entire solder feed mechanism is carried on a lever 46 which can swing about a pivot 45. The free end of this lever is moved up and down by a rod 47, thereby causing that part of the solder wire which projects from the guide tube 48 to move to and from the joint 49 on the side of the base of the lamp 50. The solder wire 41 is wound on a spool 52 on the support 51 and it is moved periodically over a distance which can be regulated in the same way as described above.

The mechanism to move the burner 53 (Fig. 5) which heats the solder wire is also similar to the one described above. The burner can oscillate on a pin on the frame 1 and it has a burner rod 55 which can move with some play between the stops 56 and 57 on the lever 46.

By the time the rod 47 moves up and when the feed mechanism reaches its extreme left position the rolls 43 and 44 will be revolved by means of a driving mechanism such as described above and actuated by stop 42, causing the solder wire to be fed forward for a certain distance. The burner rod 55 is now contact with the stop 57.

When the rod 47 moves down, the feed mechanism will move to the right. On account of the play between the stops 56 and 57 the burner rod 55 will not be taken along immediately. When the solder wire is fed forward that part of it which projects outside the guide tube 48 will not be within range of the flame from the burner 53, but as the feed mechanism moves bodily to the right, the burner stands still for a short time and the projecting part of the wire 41 is brought within range of the flame. Moving the feed mechanism further to the right causes the stop 56 to hit the burner rod 55 and take the burner along with it. The flame from this burner will, therefore, be pointed to the same point on the solder wire during this latter part of its forward movement. The burner will be so regulated that this part of the solder wire melts at the moment that the joint 49 is reached.

When the rod 47 moves up the feed mechanism will move away from the lamp base while on account of the play between the two stops 56 and 57 the flame of the burner will for a moment remain directed on the joint 49.

Fig. 5 shows an arrangement where the center contact joint 37 and the side joint 49 are made one after the other in one machine. For this purpose a device shown in Fig. 1 and one shown in Fig. 4 are arranged in two adjacent positions near the rotatable frame 40. A similar arrangement can be made for lamps with bayonet bases.

The solder wire may be prepared with a flux so that the solder will spread over the joint without any difficulty. In case, however, the wire is not filled or prepared with flux, special devices may be used to supply the joints with the soldering flux.

As previously stated, this invention is not limited to soldering of lead-in wires to bases of incandescent lamps, but may be applied to the soldering of any joint.

What I claim as new and desire to secure by Letters Patent of the United States, is:—

1. In a soldering device, the combination of solder feed mechanism for reciprocating the end of a rod of solder into and out of soldering position, movable solder heating means for the solder, and actuating means for controlling said mechanism and said heating means to heat the end of the rod of solder during its forward movement and the joint during the first portion of its backward movement.

2. In a soldering device, the combination of solder feed mechanism for moving the end of a wire of solder forward to bring its end into soldering position and backward out of said position, a burner movably mounted adjacent said feed mechanism, and means for actuating said mechanism and said burner to cause said burner during forward movement of the solder wire to direct its flame on the end of said wire throughout its forward movement and on the joint during the first portion of its backward movement.

3. In a soldering device, the combination of solder feed mechanism for moving the end of a solder wire forward and back from the joint to be soldered, a movable burner mounted to direct its flame on the end of the solder wire, and a connection between said mechanism and said burner to move said burner to direct its flame on the end of said solder wire during the forward movement of said wire and to vary the relative position of said burner and said solder wire to leave the flame directed on the joint during the initial backward movement of the solder wire.

4. In a soldering device, the combination of solder feed mechanism for moving the end of a solder wire forward and back from the joint to be soldered, a pivoted burner mounted to direct its flame on the end of said wire, and a lost motion connection between said mechanism and said burner to move said burner to keep its flame on the end of said wire during its forward movement and to change its position relative to said solder wire and leave said flame directed on the joint during the first part of the backward movement of said solder wire.

5. In a soldering device, the combination with an oscillating arm, of solder wire feed mechanism mounted on said arm to move bodily therewith to carry the end of a solder wire into and out of contact with the object to be soldered and to be actuated by movement of said arm, a burner pivotally mounted adjacent said arm to direct its flame into the path of the solder wire, and a lost motion connection between said arm and said burner to swing said burner from said arm and cause said burner to follow the movement of the arm in both directions but in different relation to the solder wire.

6. In a soldering device, the combination with an oscillating arm, of solder wire feed mechanism mounted on said arm to move bodily therewith to carry the end of a solder wire into and out of contact with the object to be soldered and to be actuated by movement of said arm, a burner pivotally mounted adjacent said arm, a rod rigidly connected to said burner, and projections on said arm spaced apart a distance greater than the width of said rod and cooperating with said rod to form a lost motion connection which permits the burner to remain stationary during the first part of the reverse movement of said arm and thereby change its position relative to the solder wire.

7. In a machine for soldering bases of incandescent lamps, the combination of a rotatable frame for carrying the lamps, and two soldering devices mounted adjacent the path of movement of each lamp, one to cooperate with the center contact of the base and the other with the side of the base, each of said devices comprising a solder wire feed mechanism for reciprocating a solder wire to bring its end into contact with the base, a burner mounted adjacent said feed mechanism to direct its flame on the end of the solder, and a lost motion connection between said mechanism and said burner to cause the flame of said burner to follow the end of the wire during its movement toward the base and to remain on the soldered joint during a portion of the backward movement of said solder wire.

In witness whereof, I have hereunto set my hand this 24th day of March, 1926.

WILLEM KONING.